US012533679B2

(12) United States Patent
Kojima et al.

(10) Patent No.: US 12,533,679 B2
(45) Date of Patent: Jan. 27, 2026

(54) REFINING DEVICE

(71) Applicant: SEIKO EPSON CORPORATION, Tokyo (JP)

(72) Inventors: Hideki Kojima, Nagano (JP); Sotaro Oana, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 252 days.

(21) Appl. No.: 18/353,931

(22) Filed: Jul. 18, 2023

(65) Prior Publication Data

US 2024/0024886 A1 Jan. 25, 2024

(30) Foreign Application Priority Data

Jul. 20, 2022 (JP) ................................ 2022-115898

(51) Int. Cl.
*B02C 18/18* (2006.01)
*B02C 18/14* (2006.01)
*D21D 1/38* (2006.01)

(52) U.S. Cl.
CPC .............. *B02C 18/18* (2013.01); *B02C 18/14* (2013.01); *B02C 2018/147* (2013.01)

(58) Field of Classification Search
CPC ....... B02C 18/18; B02C 18/14; B02C 18/147; B02C 18/144; D21D 1/38
See application file for complete search history.

(56) References Cited

U.S. PATENT DOCUMENTS

2003/0029587 A1* 2/2003 Aikawa .................... D21D 1/38 162/28
2019/0093284 A1* 3/2019 Abe ......................... D21B 1/02
2019/0301092 A1* 10/2019 Yamasaki ................ D21B 1/08

FOREIGN PATENT DOCUMENTS

JP S57-173840 U 11/1982
JP H06-262096 A 9/1994
JP H11-276916 A 10/1999

* cited by examiner

Primary Examiner — Mohammed S. Alawadi
(74) Attorney, Agent, or Firm — Global IP Counselors, LLP

(57) ABSTRACT

There is provided a refining device in which a first rotor portion has a plurality of first blades radially installed around a rotation shaft, a second rotor portion has a plurality of second blades radially installed around the rotation shaft, in a state where a rotor is rotating, a raw material charged from a charging port is refined when sequentially passing between a liner and an end portion on an outer peripheral side of the first blade and between the liner and an end portion on an outer peripheral side of the second blade, and is discharged from the discharge port, and D1>D2, where a separation distance between the liner and the end portion on the outer peripheral side of the first blade is D1, and a separation distance between the liner and the end portion on the outer peripheral side of the second blade is D2.

6 Claims, 7 Drawing Sheets

REFINING DEVICE

The present application is based on, and claims priority from JP Application Serial Number 2022-115898, filed Jul. 20, 2022, the disclosure of which is hereby incorporated by reference herein in its entirety.

BACKGROUND

1. Technical Field

The present disclosure relates to a refining device.

2. Related Art

A sheet manufacturing apparatus including a crushing section that crushes a waste paper sheet, a defibration section that defibrates crushed pieces obtained by the crushing section, an accumulation section for accumulating defibrated materials obtained by the defibration section on a flat surface, a heating/pressurization section that heats and pressurizes accumulated web, a cutting section that cuts a sheet obtained by the heating/pressurization section into a predetermined shape, and a sheet collection section that collects the obtained sheet is known.

As the defibration section, for example, a turbo type fine crusher as described in JP-A-11-276916 can be used. The turbo type fine crusher of JP-A-11-276916 includes a casing having a raw material inlet portion and a crushed product outlet portion; a liner provided on an inner surface of the casing; and a rotor rotating in the casing. When the raw material passes between the rotating rotor and the liner, the raw material is crushed and the crushed material is discharged from the crushed product outlet portion.

However, in the turbo type fine crusher described in JP-A-11-276916, the gap between the rotor and the liner is relatively narrow, and depending on the size and charge amount of the raw material, the raw material does not enter between the rotor and the liner, and there is a concern that the raw material will remain in front of the rotor. When this remaining of raw material occurs, the raw material cannot be satisfactorily pulverized.

SUMMARY

According to an aspect of the present disclosure, there is provided a refining device including: a casing having a charging port and a discharge port of a raw material; a rotor having a rotation shaft, a first rotor portion positioned on the charging port side, and a second rotor portion positioned on the discharge port side, and disposed on an inside of the casing; and a liner disposed on an inner surface of the casing along an outer periphery of the rotor, in which the first rotor portion has a plurality of first blades radially installed around the rotation shaft, the second rotor portion has a plurality of second blades radially installed around the rotation shaft, in a state where the rotor is rotating, the raw material charged from the charging port is refined when sequentially passing between the liner and an end portion on an outer peripheral side of the first blade and between the liner and an end portion on an outer peripheral side of the second blade, and is discharged from the discharge port, and D1>D2, where a separation distance between the liner and the end portion on the outer peripheral side of the first blade is D1, and a separation distance between the liner and the end portion on the outer peripheral side of the second blade is D2.

DESCRIPTION OF EMBODIMENTS

Hereinafter, the refining device of the present disclosure will be described in detail based on a preferred embodiment illustrated in the accompanying drawings.

First Embodiment

Figure 1:
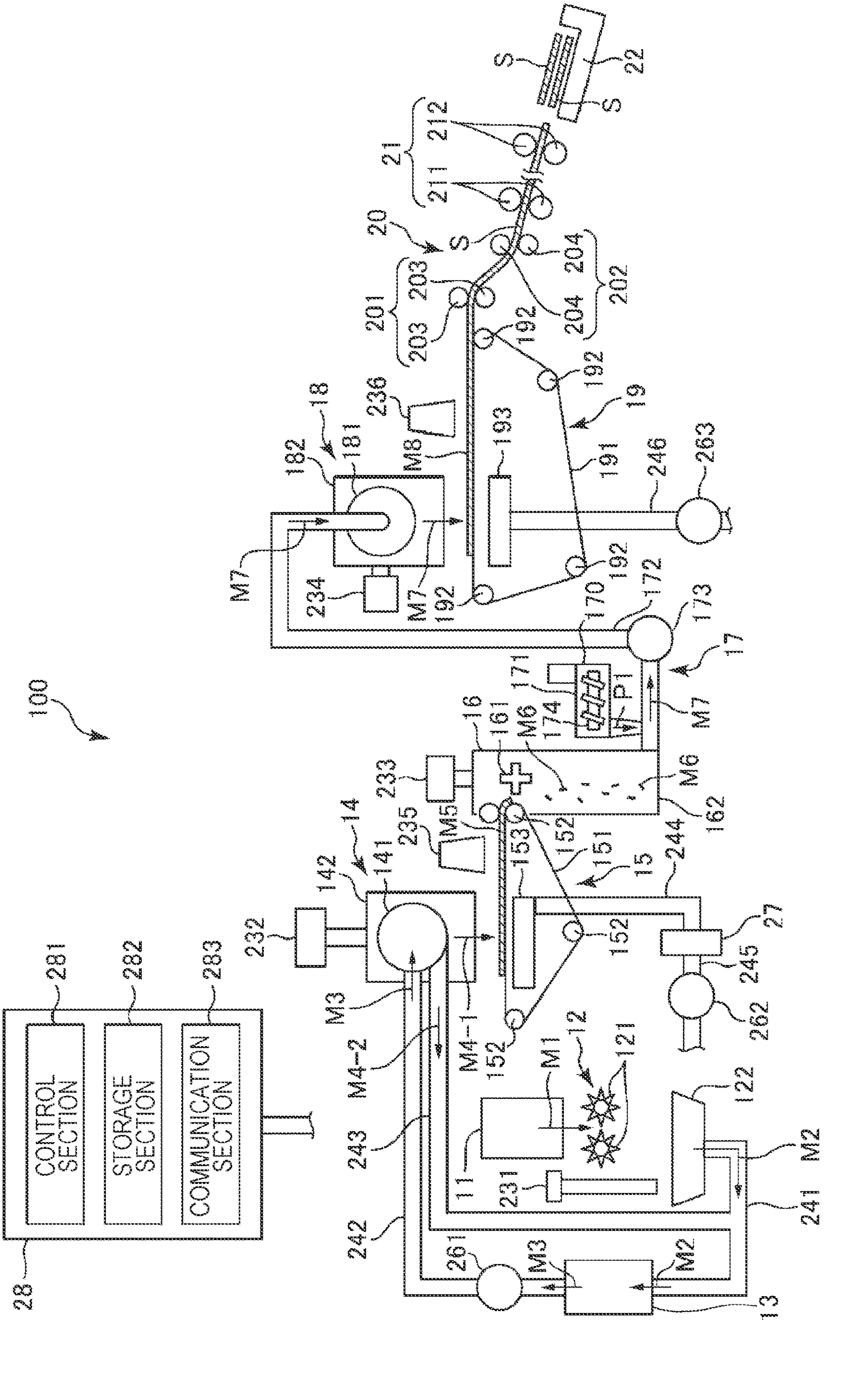
FIG. 1 is a configuration diagram illustrating an outline of a sheet manufacturing apparatus including a refining device according to a first embodiment of the present disclosure.
Figure 2:
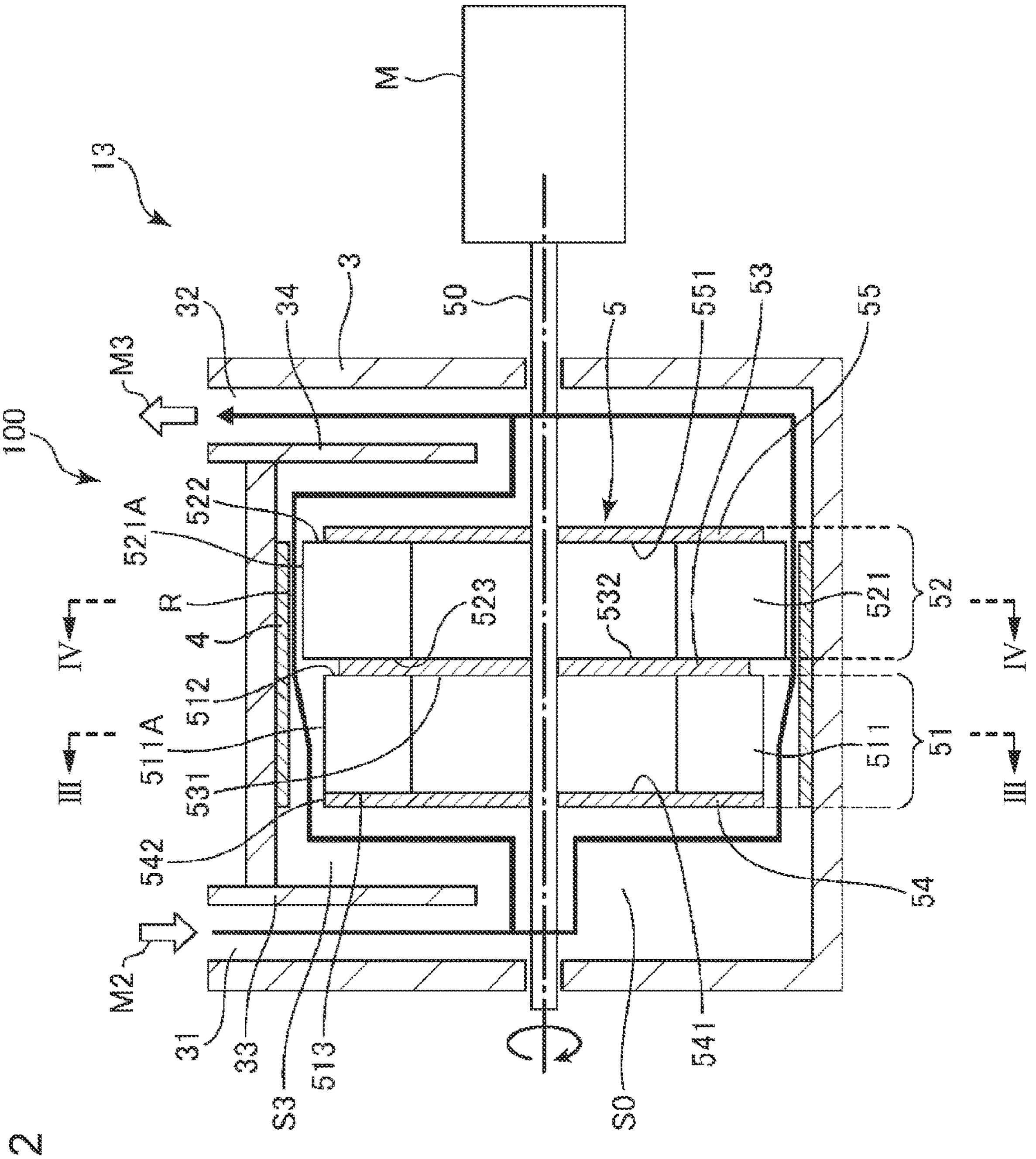
FIG. 2 is a longitudinal sectional view of the refining device illustrated in FIG. 1.
Figure 3:
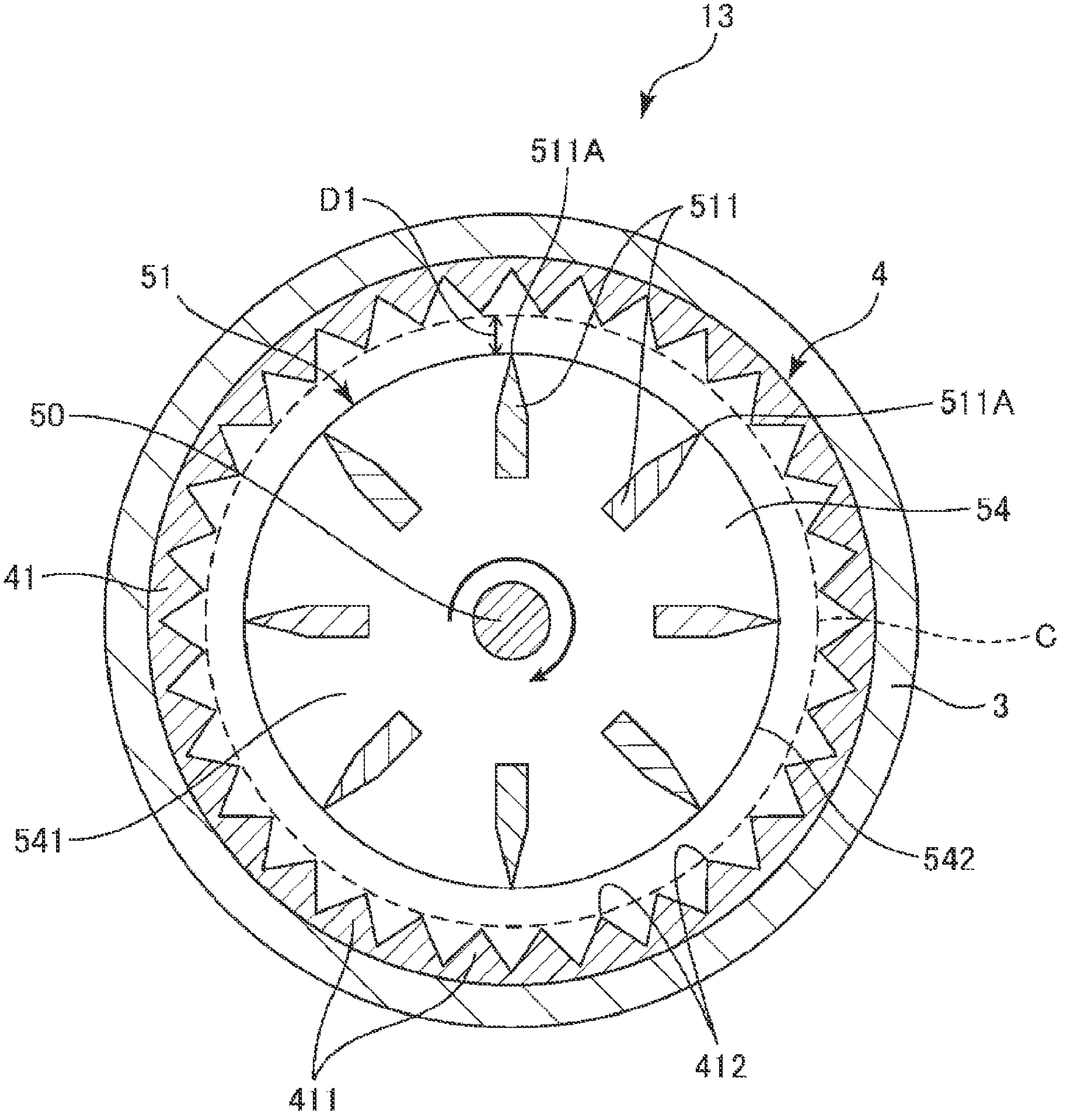
FIG. 3 is a sectional view taken along the line III-III in FIG. 2.
Figure 4:
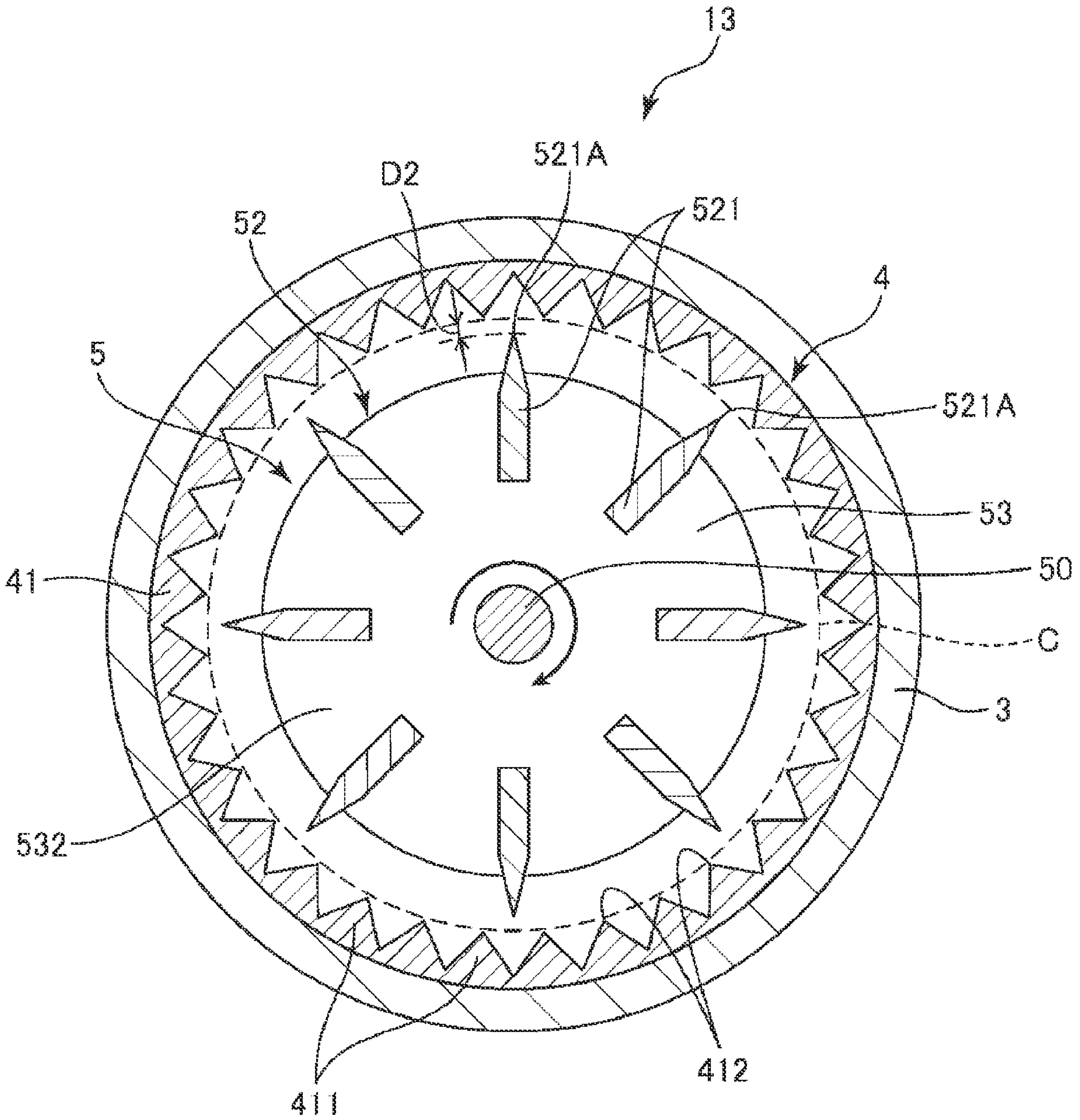
FIG. 4 is a sectional view taken along the line IV-IV in FIG. 2.

FIG. 1 is a configuration diagram illustrating an outline of a sheet manufacturing apparatus including a refining device according to a first embodiment of the present disclosure. FIG. 2 is a longitudinal sectional view of the refining device illustrated in FIG. 1. FIG. 3 is a sectional view taken along the line III-III in FIG. 2. FIG. 4 is a sectional view taken along the line IV-IV in FIG. 2.

In the following, the upper side of FIG. 1 may be referred to as "up" or "upper", and the lower side may be referred to as "down" or "lower". Further, the left side of FIGS. 2, 6, and 7 may be referred to as "left" and the right side may be referred to as "right". In addition, FIG. 1 is a schematic configuration diagram, and the positional relationship, orientation, size, and the like of each section of a sheet manufacturing apparatus 100 are not limited to those illustrated. Further, in FIG. 1, the direction in which a crushed piece M2, a defibrated material M3, a first sorted material M4-1, a second sorted material M4-2, a first web M5, a subdivided product M6, a mixture M7, a second web M8, and a recycled paper sheet S are transported, that is, the direction indicated by the arrow, is also referred to as a transport direction. Further, the tip end side of the arrow in FIG. 1 is also referred to as "downstream" in the transport direction, and the base end side of the arrow in FIG. 1 is also referred to as "upstream" in the transport direction.

The sheet manufacturing apparatus 100 illustrated in FIG. 1 is a sheet manufacturing apparatus 100 that generates a sheet-like recycled paper sheet S from a raw material M1 which is a waste paper sheet such as a used copy paper sheet.

As illustrated in FIG. 1, the sheet manufacturing apparatus 100 includes a raw material supply section 11, a crushing section 12, a refining device 13 of the present disclosure, a sorting section 14, a first web forming section 15, a subdivision section 16, a mixing section 17, a dispersion section 18, a second web forming section 19, a molding section 20, a cutting section 21, a stock section 22, and a collection section 27.

In addition, the sheet manufacturing apparatus 100 includes a humidification section 231, a humidification section 232, a humidification section 233, a humidification section 234, a humidification section 235, and a humidification section 236. In addition, the sheet manufacturing apparatus 100 includes a blower 261, a blower 262, and a blower 263.

Further, in the sheet manufacturing apparatus 100, a raw material supply step, a crushing step, a defibrating step, a sorting step, a first web forming step, a dividing step, a mixing step, a loosening step, a second web forming step, a sheet forming step, and a cutting step are executed in this order.

Hereinafter, the configurations of each section will be described.

The raw material supply section 11 is a part that performs the raw material supply step of supplying the raw material M1 to the crushing section 12. The raw material M1 is a sheet-like material made of a fiber-containing material containing cellulose fibers. In addition, the cellulose fiber may be a fibrous material containing cellulose as a compound (cellulose in a narrow sense) as a main component, and may contain hemicellulose and lignin in addition to cellulose (cellulose in a narrow sense). In addition, the raw material M1 may have any form such as a woven fabric or a non-woven fabric. Further, the raw material M1 may be, for example, recycled paper recycled and manufactured by defibrating a waste paper sheet, or Yupo synthetic paper (registered trademark), or may not be recycled paper.

The crushing section 12 is a part that performs the crushing step of crushing the raw material M1 supplied from the raw material supply section 11 in the air such as in the atmosphere. The crushing section 12 has a pair of crushing blades 121 and a chute 122.

By rotating the pair of crushing blades 121 in opposite directions, the raw material M1 can be crushed therebetween, that is, cut into the crushed pieces M2. The shape and size of the crushed piece M2 are preferably suitable for the defibration treatment in the refining device 13. Examples of the shape of the crushed piece M2 include a small piece having a square planar shape and a rectangular shape, particularly a strip-shaped small piece. Further, the size of the crushed piece M2 is preferably, for example, a small piece having an average length of one side of 100 mm or less, and more preferably 3 mm or more and 70 mm or less. The shape of the small piece may be other than a square shape or a rectangular shape. In addition, the thickness is preferably 0.07 mm or more and 0.10 mm or less.

The chute 122 is disposed below the pair of crushing blades 121 and has a funnel shape, for example. As a result, the chute 122 can receive the crushed piece M2 that was crushed by the crushing blade 121 and fell.

Further, above the chute 122, a humidification section 231 is disposed adjacent to the pair of crushing blades 121. The humidification section 231 humidifies the crushed piece M2 in the chute 122. The humidification section 231 has a filter (not illustrated) containing moisture, and is configured as a vaporization type (or warm air vaporization type) humidifier that supplies humidified air with increased humidity to the crushed piece M2 by allowing air to pass through the filter. By supplying the humidified air to the crushed piece M2, it is possible to suppress adhesion of the crushed piece M2 to the chute 122 or the like due to static electricity.

The chute 122 is coupled to the upstream of the refining device 13 through a pipe 241. That is, the downstream end portion of the pipe 241 is coupled to the charging port 31 of the refining device 13 illustrated in FIG. 2. The crushed pieces M2 collected on the chute 122 pass through the pipe 241 and are transported to the refining device 13.

As illustrated in FIG. 1, the refining device 13 is a part that performs a defibrating step of defibrating the crushed piece M2 in the air, that is, by a dry method. The defibrated material M3 can be generated from the crushed pieces M2 by the defibration treatment in the refining device 13. Here, "defibrating" refers to unraveling the crushed piece M2 formed by binding a plurality of fibers into each fiber. Then, the unraveled material becomes the defibrated material M3. The shape of the defibrated material M3 is a linear shape or a band shape. In addition, the defibrated materials M3 may exist in a state of being intertwined and agglomerated, that is, in a state of forming a so-called "lump".

Further, the refining device 13 can generate a flow of air from the crushing section 12 to the sorting section 14, that is, an air flow, by rotating the rotor 5, which will be described later. As a result, the crushed piece M2 can be introduced from the pipe 241 to the upstream of the refining device 13, and after the defibration treatment, the defibrated material M3 can be delivered to the sorting section 14 through the pipe 242.

A pipe 242 is coupled to the downstream of the refining device 13. The blower 261 configured as, for example, a turbo type fan is installed in the middle of the pipe 242. The blower 261 is an air flow generation device that generates an air flow toward the sorting section 14. As a result, the introduction of the crushed piece M2 into the refining device 13 and the delivery of the defibrated material M3 to the sorting section 14 are promoted. As will be described later, due to the structure of the refining device 13, the passage and defibration treatment of the crushed piece M2, which is a raw material, are facilitated. However, the operation of the blower 261 installed on the downstream of the refining device 13 promotes the passage of the crushed pieces M2 through the refining device 13 and defibration treatment. Further, the blower 261 may be installed on the upstream of the refining device 13.

The sorting section 14 is a part that performs a sorting step of sorting the defibrated material M3 according to the size of the fiber length. In the sorting section 14, the defibrated material M3 is sorted into a first sorted material M4-1 and a second sorted material M4-2 having a fiber length larger than that of the first sorted material M4-1. The first sorted material M4-1 has a size suitable for the subsequent manufacturing of the recycled paper sheet S. On the other hand, the second sorted material M4-2 includes, for example, those with insufficient defibration, those in which the defibrated fibers are excessively aggregated, and the like.

The sorting section 14 has a drum section 141 and a housing section 142 that stores the drum section 141.

The drum section 141 is formed of a cylindrical net body, and is a sieve that rotates around a central axis thereof. The defibrated material M3 flows into the drum section 141. Then, as the drum section 141 rotates, the defibrated material M3 smaller than the mesh opening of the net is sorted as the first sorted material M4-1, and the defibrated material M3 having a size equal to or larger than the mesh opening of the net is sorted as the second sorted material M4-2. The first sorted material M4-1 falls from the drum section 141.

On the other hand, the second sorted material M4-2 is delivered to a pipe 243 coupled to the drum section 141. The end portion of the pipe 243 on the opposite side to the drum section 141, that is, on the downstream is coupled to the middle of the pipe 241. The second sorted material M4-2 that passed through the pipe 243 joins the crushed piece M2 in the pipe 241 and flows into the refining device 13 together with the crushed piece M2. As a result, the second sorted material M4-2 is returned to the refining device 13, and is defibrated together with the crushed piece M2.

In addition, the first sorted material M4-1 that fell from the drum section 141 falls while being dispersed in the air, and is oriented toward the first web forming section 15 positioned below the drum section 141. The first web forming section 15 is a part that performs the first web forming step of forming the first web M5 from the first sorted material M4-1. The first web forming section 15 includes a mesh belt 151, three tension rollers 152, and a suction section 153.

The mesh belt 151 is an endless belt on which the first sorted material M4-1 is accumulated. The mesh belt 151 is hung around three tension rollers 152. Then, the first sorted material M4-1 on the mesh belt 151 is transported to the downstream by the rotational drive of the tension roller 152.

The first sorted material M4-1 has a size equal to or larger than the mesh opening of the mesh belt 151. As a result, the passage of the first sorted material M4-1 through the mesh belt 151 is restricted, and accordingly, the first sorted material M4-1 can be accumulated on the mesh belt 151. In addition, since the first sorted material M4-1 is transported to the downstream together with the mesh belt 151 while being accumulated on the mesh belt 151, the first sorted material M4-1 is formed as a layered first web M5.

In addition, for example, there is a concern that dust or dirt will be mixed in the first sorted material M4-1. Dust or dirt may be generated by, for example, crushing or defibrating. Then, such dust or dirt will be collected by the collection section 27 which will be described later.

The suction section 153 is a suction mechanism that suctions air from below the mesh belt 151. As a result, dust or dirt that passed through the mesh belt 151 can be suctioned together with the air.

Further, the suction section 153 is coupled to the collection section 27 through a pipe 244. The dust or dirt suctioned by the suction section 153 is collected by the collection section 27.

A pipe 245 is further coupled to the collection section 27. In addition, the blower 262 is installed in the middle of the pipe 245. By operating the blower 262, a suction force can be generated in the suction section 153. Accordingly, the formation of the first web M5 is promoted on the mesh belt 151. Dust or dirt is removed from the first web M5. Further, the dust or dirt pass through the pipe 244 and reach the collection section 27 by the operation of the blower 262.

The housing section 142 is coupled to the humidification section 232. The humidification section 232 is configured as a vaporization type humidifier. As a result, humidified air is supplied into the housing section 142. The first sorted material M4-1 can be humidified by the humidified air, and thus it is also possible to suppress adhesion of the first sorted material M4-1 to the inner wall of the housing section 142 due to electrostatic force.

The humidification section 235 is disposed on the downstream of the sorting section 14. The humidification section 235 is configured as an ultrasonic humidifier that sprays water. As a result, moisture can be supplied to the first web M5, and thus the water content of the first web M5 is adjusted. By this adjustment, the adsorption of the first web M5 to the mesh belt 151 due to the electrostatic force can be suppressed. As a result, the first web M5 is easily peeled off from the mesh belt 151 at the position where the mesh belt 151 is folded back by the tension roller 152.

The subdivision section 16 is disposed on the downstream of the humidification section 235. The subdivision section 16 is a part that performs the dividing step of dividing the first web M5 peeled off from the mesh belt 151. The subdivision section 16 has a propeller 161 rotatably supported and a housing section 162 that stores the propeller 161. Then, the first web M5 can be divided by the rotating propeller 161. The divided first web M5 becomes a subdivided product M6. Further, the subdivided product M6 descends in the housing section 162.

The housing section 162 is coupled to the humidification section 233. The humidification section 233 is configured as a vaporization type humidifier. As a result, humidified air is supplied into the housing section 162. The humidified air can also suppress adhesion of the subdivided product M6 to the inner wall of the propeller 161 or the housing section 162 due to electrostatic force.

The mixing section 17 is disposed on the downstream of the subdivision section 16. The mixing section 17 is a part that performs a mixing step of mixing the subdivided product M6 and the additive. The mixing section 17 includes an additive supply section 171, a pipe 172, and a blower 173.

The pipe 172 is a flow path which couples the housing section 162 of the subdivision section 16 and a housing 182 of the dispersion section 18, and through which the mixture M7 of the subdivided product M6 and the additive passes.

An additive supply section 171 is coupled to the middle of the pipe 172. The additive supply section 171 has a housing section 170 in which the additive is contained, and a screw feeder 174 provided in the housing section 170. By the rotation of the screw feeder 174, the additive in the housing section 170 is pushed out from the housing section 170 and supplied into the pipe 172. The additive supplied into the pipe 172 is mixed with the subdivided product M6 to form the mixture M7.

Here, examples of the additive supplied from the additive supply section 171 include a binder for binding fibers to each other, a colorant for coloring the fibers, an aggregation inhibitor for suppressing aggregation of the fibers, a flame retardant for making fibers and the like hard to burn, a paper strength enhancer for enhancing the paper strength of the recycled paper sheet S, and a defibrated material, and one or more of these can be used in combination. Hereinafter, as an example, a case where the additive is a binder P1 will be described. When the additive contains a binding material that binds the fibers to each other, the strength of the recycled paper sheet S can be increased.

Examples of the binder P1 include: natural product-derived ingredients such as starch, dextrin, glycogen, amylose, hyaluronic acid, arrowroot, konjac, potato starch, etherified starch, esterified starch, natural gum glue, fiber-derived glue, seaweed, and animal protein; polyvinyl alcohol; polyacrylic acid; and polyacrylamide, and one or two or more selected from these can be used in combination. However, a natural product-derived ingredient is preferable, and starch is more preferable. Further, for example, thermoplastic resins such as various polyolefins, acrylic resins, polyvinyl chloride, polyester, and polyamide; and various thermoplastic elastomers can also be used.

Further, in the middle of the pipe 172, the blower 173 is installed on the downstream of the additive supply section 171. The action of the rotation section such as a blade of the blower 173 promotes mixing of the subdivided product M6 and the binder P1. In addition, the blower 173 can generate an air flow toward the dispersion section 18. The subdivided product M6 and the binder P1 can be stirred in the pipe 172 by this air flow. As a result, the mixture M7 is transported to the dispersion section 18 in a state where the subdivided product M6 and the binder P1 are uniformly dispersed. Further, the subdivided product M6 in the mixture M7 is loosened in the process of passing through the pipe 172 to become a finer fibrous form.

In addition, the blower 173 is electrically coupled to a control device 28, and the operation thereof is controlled. Further, by adjusting the air blowing volume of the blower 173, the amount of air sent into a drum 181 can be adjusted.

Although not illustrated, the end portion of the pipe 172 on the drum 181 side is branched, and the branched end portions are coupled to an introduction port (not illustrated) formed on the end surface of the drum 181, respectively.

The dispersion section 18 illustrated in FIG. 1 is a part of the mixture M7 that performs a loosening step of loosening and releasing fibers that are intertwined with each other. The dispersion section 18 includes a drum 181 that introduces and releases the mixture M7 that is a defibrated material, and a housing 182 that stores the drum 181.

The drum 181 is formed of a cylindrical net body, and is a sieve that rotates around a central axis thereof. As the drum 181 rotates, fibers or the like smaller than the mesh opening of the net of the mixture M7 can pass through the drum 181. At that time, the mixture M7 is loosened and released together with the air. That is, the drum 181 functions as a release section that releases a material containing fibers.

The drum 181 is coupled to a driving source (not illustrated), and rotates by a rotational force output from the driving source. The driving source is electrically coupled to the control device 28, and the operation thereof is controlled.

Further, the housing 182 is coupled to the humidification section 234. The humidification section 234 is configured as a vaporization type humidifier. As a result, humidified air is supplied into the housing 182. The inside of the housing 182 can be humidified by the humidified air, and thus it is also possible to suppress adhesion of the mixture M7 to the inner wall of the housing 182 due to electrostatic force.

In addition, the mixture M7 released by the drum 181 falls while being dispersed in the air, and is oriented toward the second web forming section 19 positioned below the drum 181. The second web forming section 19 is a part that performs the second web forming step of accumulating the mixture M7 to form the second web M8 which is the accumulated material. The second web forming section 19 includes a mesh belt 191, a tension roller 192, and a suction section 193.

The mesh belt 191 is a mesh member, and in the illustrated configuration, the mesh belt 191 is configured as an endless belt. Further, the mixture M7 dispersed and released by the dispersion section 18 is accumulated on the mesh belt 191. The mesh belt 191 is hung around four tension rollers 192. Then, the mixture M7 on the mesh belt 191 is transported to the downstream by the rotational drive of the tension roller 192.

In the illustrated configuration, the mesh belt 191 is used as an example of the mesh member, but the present disclosure is not limited to this, and for example, a flat plate shape may be used.

In addition, most of the mixture M7 on the mesh belt 191 has a size equal to or larger than the mesh opening of the mesh belt 191. As a result, the passage of the mixture M7 through the mesh belt 191 is restricted, and accordingly, the mixture M7 can be accumulated on the mesh belt 191. In addition, since the mixture M7 is transported to the downstream together with the mesh belt 191 while being accumulated on the mesh belt 191, the mixture M7 is formed as a layered second web M8.

The suction section 193 is a suction mechanism that suctions air from below the mesh belt 191. Thereby, the mixture M7 can be suctioned onto the mesh belt 191, and thus the accumulation of the mixture M7 on the mesh belt 191 is promoted.

A pipe 246 is coupled to the suction section 193. In addition, the blower 263 is installed in the middle of the pipe 246. By operating the blower 263, a suction force can be generated in the suction section 193.

The humidification section 236 is disposed on the downstream of the dispersion section 18. The humidification section 236 is configured as an ultrasonic humidifier, which is the same as the humidification section 235. As a result, moisture can be supplied to the second web M8, and thus the water content of the second web M8 is adjusted. By this adjustment, the adsorption of the second web M8 to the mesh belt 191 due to the electrostatic force can be suppressed. As a result, the second web M8 is easily peeled off from the mesh belt 191 at the position where the mesh belt 191 is folded back by the tension roller 192.

The total water content added to the humidification section 231 to the humidification section 236 is preferably, for example, 0.5 parts by mass or more and 20 parts by mass or less with respect to 100 parts by mass of the material before humidification.

The molding section 20 is disposed on the downstream of the second web forming section 19. The molding section 20 is a part that performs a sheet forming step of forming the recycled paper sheet S from the second web M8. The molding section 20 has a pressurization section 201 and a heating section 202.

The pressurization section 201 has a pair of calendar rollers 203, and can pressurize the second web M8 between the calendar rollers 203 without heating. Thereby, the density of the second web M8 is increased. The degree of heating in the case of heating is preferably a degree that the binder P1 is not melted, for example. Then, the second web M8 is transported toward the heating section 202. One of the pair of calendar rollers 203 is a main roller driven by the operation of a motor (not illustrated), and the other is a driven roller.

The heating section 202 has a pair of heating rollers 204, and can pressurize the second web M8 while heating the second web M8 between the heating rollers 204. By this heating and pressurization, the binder P1 is melted in the second web M8, and the fibers are bound to each other through the melted binder P1. As a result, the recycled paper sheet S is formed. Then, the recycled paper sheet S is transported toward the cutting section 21. One of the pair of heating rollers 204 is a main roller driven by the operation of a motor (not illustrated), and the other is a driven roller.

The cutting section 21 is disposed on the downstream of the molding section 20. The cutting section 21 is a part that performs a cutting step of cutting the recycled paper sheet S. The cutting section 21 has a first cutter 211 and a second cutter 212.

The first cutter 211 cuts the recycled paper sheet S in a direction intersecting the transport direction of the recycled paper sheet S, particularly in a direction orthogonal to the transport direction.

The second cutter 212 cuts the recycled paper sheet S in a direction parallel to the transport direction of the recycled paper sheet S on the downstream of the first cutter 211. In this cutting, unnecessary parts of both end portions of the recycled paper sheet S in the width direction are removed to adjust the width of the recycled paper sheet S.

By cutting the first cutter 211 and the second cutter 212 in this manner, the recycled paper sheet S having a desired shape and size can be obtained. Then, the recycled paper sheet S is transported further downstream and accumulated in the stock section 22.

Each section of the sheet manufacturing apparatus 100 is electrically coupled to the control device 28. The operation of each of these sections is controlled by the control device 28.

As illustrated in FIG. 1, the control device 28 includes a control section 281, a storage section 282, and a communication section 283.

The control section 281 has at least one processor and executes various programs stored in the storage section 282. As the processor, for example, a central processing unit (CPU) can be used. In addition, the control section 281 has various functions such as a function of controlling the drive of each part of the device related to sheet manufacturing, such as a function of controlling the drive of the blower 261, and a drive control of a motor M, which will be described later, in the sheet manufacturing apparatus 100.

By controlling the energization of the blower 261 and the motor M by the control section 281, the blower 261 and the motor M are driven and rotated at a predetermined timing and a predetermined rotation speed, respectively. It is preferable that the blower 261 and the motor M be driven to substantially overlap in time. As a result, smooth passage of the raw material into the refining device 13 and good defibration treatment are promoted.

For example, a program related to sheet manufacturing is stored in the storage section 282. Regarding the refining of the raw material by the refining device 13, a program related to the operation sequence including conditions such as the operation timing and the rotation speed of the blower 261 and the motor M is stored.

The communication section 283 is configured as, for example, an I/O interface and communicates with each section of the sheet manufacturing apparatus 100. Further, the communication section 283 has a function of communicating with a computer or a server (not illustrated) through a network, for example.

The control device 28 may be built in the sheet manufacturing apparatus 100 or may be provided in an external device such as an external computer. Further, for example, the control section 281 and the storage section 282 may be integrated into one unit or may be configured as one unit, the control section 281 is built in the sheet manufacturing apparatus 100 and the storage section 282 is provided in an external device such as an external computer, or the storage section 282 may be built in the sheet manufacturing apparatus 100 and the control section 281 may be provided in an external device such as an external computer.

Next, the configuration of the refining device 13 will be described.

As illustrated in FIG. 2, the refining device 13 refines the supplied raw material to generate a refined material and discharges the refined material. In the present embodiment, the refining device 13 is a defibrating device that defibrates the supplied crushed piece M2 and generates the defibrated material M3.

In the refining device 13 incorporated in the sheet manufacturing apparatus 100 illustrated in FIG. 1, the second sorted material M4-2 is also mixed with the crushed piece M2 as a raw material to be introduced, but the amount of the second sorted material M4-2 in the raw material is smaller than that of the crushed piece M2, and thus, hereinafter, the raw material to be introduced will be described below as the crushed piece M2.

The refining device 13 includes a casing 3, a liner 4 disposed on the inner surface of the casing 3, the rotor 5 rotatably installed inside the casing 3, and the motor M for rotationally driving the rotor 5. The crushed piece M2 is defibrated when passing between the liner 4 and the outer peripheral portion of the rotating rotor 5, and becomes the defibrated material M3.

The casing 3 has the charging port 31 for charging the crushed piece M2 into the casing 3, and a discharge port 32 for discharging the generated defibrated material M3 to the outside of the casing 3. The casing 3 is a cylindrical member having an internal space S0 for storing the liner 4 and the rotor 5.

The charging port 31 is provided on the side near the left end portion of the casing 3. Further, the charging port 31 is provided to protrude outward in the radial direction of the casing 3 in a tubular shape. The charging port 31 is coupled to a downstream end portion of the pipe 241 illustrated in FIG. 1, and the crushed piece M2 generated by the crushing section 12 is charged into the casing 3 from the charging port 31 through the pipe 241.

The discharge port 32 is provided on the side near the right end portion of the casing 3. Further, the discharge port 32 is provided to protrude outward in the radial direction of the casing 3 in a tubular shape. The discharge port 32 is coupled to an upstream end portion of the pipe 242 illustrated in FIG. 1, and the generated defibrated material M3 is discharged to the outside of the casing 3 and transported to the sorting section 14 through the pipe 242.

The charging port 31 and the discharge port 32 are positioned at the upper part of the casing 3 in FIG. 2, that is, the positions of the casing 3 in the peripheral direction are the same. Further, the protruding directions of the charging port 31 and the discharge port 32 are directed in the tangential direction of the inner periphery of the casing 3. However, the formation positions of the charging port 31 and the discharge port 32 are not limited to the above, and may be shifted by a predetermined angle or may be on the opposite side, and the protruding direction is not particularly limited.

Further, the casing 3 has a partition plate 33 and a partition plate 34 provided in the internal space S0. The partition plate 33 is provided on the extension of the charging port 31, and is installed such that the thickness direction thereof is along a rotation shaft 50. The partition plate 34 is provided on the extension of the discharge port 32, and is installed such that the thickness direction thereof is along the rotation shaft 50. The partition plate 33 and the partition plate 34 are disposed substantially in parallel with each other. The end portions of the partition plate 33 and the partition plate 34 on the rotation shaft 50 side are separated from the rotation shaft 50.

By providing the partition plate 33, the crushed piece M2 charged from the charging port 31 can be guided to the near part of the rotation shaft 50. Therefore, this contributes to the formation of the air flow described later, the partition plate 34 is provided, and accordingly, the generated defibrated material M3 can be effectively guided to the discharge port 32. Therefore, the defibrated material M3 can be discharged more smoothly.

The liner 4 is a tubular member disposed on the entire periphery of the inner surface of a cylindrical part of the casing 3. The central axis of the liner 4 is coaxial with the rotation shaft 50. As illustrated in FIGS. 3 and 4, the outer peripheral surface of the liner 4 is fixed to the inner peripheral surface of the casing 3. As illustrated in FIG. 3, the length of the liner 4 in the shaft direction thereof is the length to the extent including the first blade 511 and the second blade 521, which will be described later. The liner 4 is made of a hard material such as metal.

Further, teeth 41 are formed on the inner periphery of the liner 4.

The teeth 41 are provided along the peripheral direction of the liner 4, and have a plurality of protrusion portions 411 protruding toward the center. Further, the protrusion portion 411 extends along the shaft direction of the casing 3. Each protrusion portion 411 has the same protrusion height and has a top portion 412. The center of a circle C linking each top portion 412 is concentric with the rotation shaft 50.

When the crushed piece M2 passes between the teeth 41 and the outer peripheral portion of the rotating rotor 5, the crushed piece M2 collides with the protrusion portions 411 of the teeth 41 and is defibrated to generate the defibrated material M3.

The rotor 5 has the rotation shaft 50, a first rotor portion 51, a second rotor portion 52 positioned on the right side of the first rotor portion 51, a fixing plate 53 positioned between the first rotor portion 51 and the second rotor portion 52, a side plate 54 positioned on the left side of the first rotor portion 51, and a side plate 55 positioned on the right side of the second rotor portion 52.

The rotation shaft 50 has a long shape and is installed to penetrate the casing 3 in a direction extending in the left-right direction. The rotation shaft 50 is rotatably supported by the casing 3 through a shaft bearing (not illustrated), and a right end portion is coupled to an output shaft of the motor M. The motor M is driven by energizing the motor M, and the rotation shaft 50 rotates in a predetermined direction. In addition, a speed reducer (not illustrated) may be installed between the output shaft of the motor M and the rotation shaft 50.

In the middle of the rotation shaft 50 in the longitudinal direction, the fixing plate 53, the side plate 54, and the side plate 55 are separated from each other and fixed. The fixing plate 53, the side plate 54, and the side plate 55 have a disk shape, and each of these is provided with a through-hole (not illustrated) for inserting and fixing the rotation shaft 50 at the central portion. The fixing plate 53, the side plate 54, and the side plate 55 are fixed to the rotation shaft 50 by fitting the rotation shaft 50 into through-holes formed therein.

As illustrated in FIGS. 2 and 3, the first rotor portion 51 has the plurality of first blades 511 radially disposed around the rotation shaft 50, and the side plate 54 positioned on the left side of each first blade 511. In the present embodiment, the number of installed first blades 511 is eight, and the first blades 511 are disposed around the rotation shaft 50 at equal angular intervals.

Each of the first blades 511 has a plate shape, particularly a flat plate shape, and each main surface is disposed in a direction along the radial direction of the casing 3 and the rotor 5. In each first blade 511, a right end surface 512 is fixed to a left surface 531 of the fixing plate 53. In addition, each first blade 511 has a left end surface 513 fixed to a right surface 541 of the side plate 54. The end portions on the outer peripheral side of each of the first blades 511 are separated from the top portion 412 of the protrusion portion 411 by a predetermined distance, and rotate in a non-contact manner with the liner 4.

As illustrated in FIGS. 2 and 4, the second rotor portion 52 has the plurality of second blades 521 radially disposed around the rotation shaft 50, and the side plate 55 positioned on the right side of each second blade 521. In the present embodiment, the number of installed second blades 521 is eight. The second blades 521 are disposed around the rotation shaft 50 at equal angular intervals.

Each of the second blades 521 has a plate shape, particularly a flat plate shape, and each main surface is disposed in a direction along the radial direction of the casing 3 and the rotor 5. In each second blade 521, a right end surface 522 is fixed to a left surface 551 of the side plate 55. In addition, each second blade 521 has a left end surface 523 fixed to a right surface 532 of the fixing plate 53. The end portions on the outer peripheral side of each of the second blades 521 are separated from the top portion 412 of the protrusion portion 411 by a predetermined distance, and rotate in a non-contact with the liner 4.

In addition, the first blade 511 and the second blade 521 are not limited to flat plates, and may be curved or bent into a desired shape, respectively.

The fixing plate 53, the side plate 54, and the side plate 55 are disposed with a predetermined interval along the shaft direction of the rotation shaft 50 and substantially in parallel with each other. In the present embodiment, the fixing plate 53 and the side plate 54, and the fixing plate 53 and the side plate 55 are disposed with equal intervals.

In the following description, the end portion on the outer peripheral side of the first blade 511 is referred to as an edge 511A, and an end portion on the outer peripheral side of the second blade 521 is referred to as an edge 521A. Each edge 511A is at an equal distance from the rotation center of the rotor 5, that is, the rotation shaft 50. Further, each edge 521A is at an equal distance from the rotation shaft 50.

As illustrated in FIG. 3, the thickness of the first blade 511 gradually decreases from the rotation shaft side toward the edge 511A. That is, the edge 511A of the first blade 511 is sharp. Thereby, good defibration of the crushed piece M2 can be performed between the edge 511A and the top portion 412 of the tooth 41. The average thickness of each first blade 511 is equal, but the present disclosure is not limited thereto.

The longitudinal direction of each edge 511A, that is, the left-right direction in FIG. 2 is parallel to the rotation shaft 50, but the present disclosure is not limited to this, and the longitudinal direction may be inclined by a predetermined angle in the up-down direction in FIG. 2 with respect to a line segment parallel to the rotation shaft 50 or in the front-rear direction of the paper surface.

As illustrated in FIG. 4, the thickness of the second blade 521 gradually decreases from the rotation shaft side toward the edge 521A. That is, the edge 521A of the second blade 521 is sharp. Thereby, good defibration of the crushed piece M2 can be performed between the edge 521A and the top portion 412 of the tooth 41. The average thickness of each second blade 521 is equal, but the present disclosure is not limited thereto.

The longitudinal direction of each edge 521A, that is, the left-right direction in FIG. 2 is parallel to the rotation shaft 50, but the present disclosure is not limited to this, and the longitudinal direction may be inclined by a predetermined angle in the up-down direction in FIG. 2 with respect to a line segment parallel to the rotation shaft 50 or in the front-rear direction of the paper surface.

The side plate 54 has a circular outer edge portion 542. As illustrated in FIGS. 2 and 3, the outer edge portion 542 is positioned at substantially the same position as the edge 511A of the first blade 511 in the radial direction of the first rotor portion 51, or is positioned further on the rotation shaft 50 side than the edge 511A unlike the drawings. As a result, the crushed piece M2 can be more smoothly transferred between the liner 4 and the outer periphery of the first rotor portion 51.

Each first blade 511 is fixed to the rotation shaft through the fixing plate 53 and the side plate 54, and each second blade 521 is fixed to the rotation shaft 50 through the fixing plate 53 and the side plate 55. As a result, when the rotation shaft 50 rotates, each first blade 511 and each second blade 521 rotate around the rotation shaft 50 together with the fixing plate 53, the side plate 54, and the side plate 55. The crushed piece M2 is defibrated when passing between the liner 4 and each rotating first blade 511, and further finely defibrated when passing between the liner 4 and each rotating second blade 521.

The fixing plate 53 is positioned between the first blade 511 and the second blade 521, and fixes both the first blade 511 and the second blade 521. The outer peripheral portion of the fixing plate 53 is separated from the liner 4 by a predetermined distance. The first blade 511 and the second blade 521 can stably rotate together with the fixing plate 53, the side plate 54, and the side plate 55 in a state where the positional relationship is fixed with each other.

As described above, the rotor 5 has the first rotor portion 51 including the first blade 511 and the second rotor portion 52 including the second blade 521, and accordingly, the defibration is performed in two stages by these. As a result, the defibration of the crushed piece M2 can be smoothly and efficiently performed, and the degree of defibration can be further increased, as compared with the case where the defibration is performed in one stage.

The rotation speed of the rotor 5 at the time of defibration is not particularly limited, but is preferably 1,000 rpm or more and 300,000 rpm or less, and more preferably 2,000 rpm or more and 20,000 rpm or less.

In the present embodiment, each first blade 511 has the same shape and size, and each second blade 521 has the same shape and size. However, the present disclosure is not limited to this configuration, and at least one of the first blades 511 may have a different shape or a different size from the others, and at least one of the second blades 521 may have a different shape or a different size from the others.

In the present embodiment, the average thickness of the first blade 511 and the average thickness of the second blade 521 are the same.

Further, the first blade 511 and the second blade 521 are disposed in the same pattern when viewed from the shaft direction of the rotation shaft 50. In the present embodiment, the first blade 511 and the second blade 521 have the same number of blades and the same disposition pattern. However, the present disclosure is not limited to this configuration, and for example, the first blades 511 and the second blades 521 may have different installation number and may have different disposition pitches in the peripheral direction.

The first blade 511 and the second blade 521 are made of a hard material such as metal. The first blade 511 and the second blade 521 are preferably made of the same material, but the present disclosure is not limited thereto.

The first blade 511 and the second blade 521 are disposed in the same pattern when viewed from the shaft direction of the rotation shaft 50. That is, each first blade 511 and each second blade 521 overlaps each other when viewed from the shaft direction of the rotation shaft 50. With such a configuration, when viewed from the shaft direction of the rotation shaft 50, the gap between the first blades 511 adjacent to each other and the gap between the second blades 521 adjacent to each other overlap each other. Therefore, a cleaning member such as a brush can be easily inserted, and maintenance can be easily performed.

However, the present disclosure is not limited to this configuration, and only a part of one of the first blade 511 and the second blade 521 may overlap each other, or both of the disposition positions may be shifted in the peripheral direction or in the radial direction of the rotor 5.

The internal space on the right side of the second rotor portion 52 and the inside of the discharge port 32 are set to negative pressure by the operation of the blower 261 described above. In this state, when the rotor 5 rotates in a predetermined direction, for example, clockwise in FIG. 3, an air flow that sequentially passes through the charging port 31, the space between the partition plate 33 and the left wall portion of the casing 3, an internal space S0 on the left of the side plate 54, the space between the liner 4 and the edges 511A of each first blade 511, the space between the liner 4 and the edge 521A of each second blade 521, the internal space S0 on the right side of the side plate 55, the space between the partition plate 34 and the right wall portion of the casing 3, and the discharge port 32, is generated. As a result, the crushed piece M2 follows the same route as this air flow, that is, a route R illustrated in FIG. 2. The crushed piece M2 is refined, that is, defibrated when sequentially passing between the liner 4 and the edge 511A of each first blade 511, and between the liner 4 and the edge 521A of each second blade 521.

In the refining device of the related art, the gap between the liner 4 and the outer periphery of the blade corresponding to the first blade 511 is set to be relatively narrow. Therefore, the raw material has a problem that the crushed piece M2 remains in the space that corresponds to a space S3 between the partition plate 33 and the side plate 54, causes local clogging, and does not smoothly transfer between the liner 4 and the outer periphery of the first blade 511.

On the other hand, the refining device 13 can solve the above-mentioned problem by having the following configuration. The details will be described below.

As illustrated in FIGS. 3 and 4, D1>D2 is satisfied, where a separation distance between the liner 4 and the edge 511A on the first blade 511 is D1, and a separation distance between the liner 4 and the edge 521A of the second blade 521 is D2. Thereby, it is possible to prevent the crushed piece M2 from remaining in the space S3 between the partition plate 33 and the side plate 54 or causing local clogging. Therefore, the crushed piece M2 introduced into the casing 3 can smoothly transfer between the liner 4 and the outer periphery of the first blade 511, and the defibration treatment can be smoothly performed.

In addition, the separation distance D1 refers to the shortest distance between the top portion 412 of the liner 4 and the edge 511A of the first blade 511. That is, the separation distance D1 refers to the shortest distance between the circle C passing through each top portion 412 of the teeth 41 of the liner 4 and the edge 511A, in the cross section of the first rotor portion 51. The separation distance D1 is not particularly limited, but can be, for example, a value of 0.2 mm or more and 10 mm or less.

In addition, the separation distance D2 refers to the shortest distance between the top portion 412 of the liner 4 and the edge 521A of the second blade 521. That is, the separation distance D2 refers to the shortest distance between the circle C passing through each top portion 412 of the liner 4 and the edge 521A, in the cross section of the second rotor portion 52. The separation distance D2 is not particularly limited, but can be, for example, a value of 0.1 mm or more and 9.5 mm or less.

In the refining device 13, it is preferable to satisfy $0.5 \leq D2/D1 \leq 0.95$, and more preferable to satisfy $0.6 \leq D2/D1 \leq 0.8$. As a result, the effect of the present disclosure can be exhibited more remarkably, and the defibration treatment, that is, the refining treatment can be performed more satisfactorily.

When D1/D2 is extremely large, the difference between D1 and D2 becomes small, and there is a concern that the above-described effects of the present disclosure is diminished depending on other conditions such as the numerical values of D1 and D2, the number of first blades 511, the number of second blades 521, the rotation speed of the rotor 5, and the size and supply amount of raw materials.

On the other hand, when D1/D2 is extremely small, the difference between D1 and D2 becomes large, and there is a concern that the balance of refining in the first rotor portion 51 and the second rotor portion 52 becomes poor depending on other conditions such as the numerical values of D1 and D2, the number of first blades 511, the number of second blades 521, the rotation speed of the rotor 5, and the size and supply amount of raw materials. That is, there is a concern that the defibrating efficiency will decrease.

Further, the edge 511A, which is an end portion on the outer peripheral side of the first blade 511, is positioned on the rotation shaft 50 side of the edge 521A, which is the end portion on the outer peripheral side of the second blade 521. That is, the distance from the rotation shaft 50 to the edge 511A is larger than the distance from the rotation shaft 50 to the edge 521A.

In the present disclosure, by changing the thickness of the liner 4 between the first rotor portion 51 and the second rotor portion 52, that is, making the height of the protrusion portion 411 of the part corresponding to the first blade 511 smaller than the height of the protrusion portion 411 of the part corresponding to the second blade 521, and by making the distance from the rotation shaft 50 to the edge 511A the same as the distance from the rotation shaft 50 to the edge 521A, D1>D2 can also be satisfied.

On the other hand, when D1>D2 is satisfied by making the positions of the edge 511A and the edge 521A different in the radial direction, that is, making the distance from the rotation shaft 50 to the edge 511A larger than the distance from the rotation shaft 50 to the edge 521A, the liner 4 having a constant thickness along the shaft direction of the rotation shaft 50, that is, the liner 4 having a constant height of the protrusion portion 411 can be used. As a result, the structure of the liner 4 is simplified, the manufacture thereof becomes easy, and the assembly and manufacturing of the refining device 13 become easy.

As described above, the refining device 13 includes: the casing 3 having the charging port 31 and the discharge port 32 of the crushed piece M2 as a raw material; the rotor 5 having the rotation shaft 50, the first rotor portion 51 positioned on the charging port 31 side, and the second rotor portion 52 positioned on the discharge port 32 side, and disposed on the inside of the casing 3; and the liner 4 disposed on the inner surface of the casing 3 along the outer periphery of the rotor 5. Further, the first rotor portion 51 has the plurality of first blades 511 radially installed around the rotation shaft 50, the second rotor portion 52 has the plurality of second blades 521 radially installed around the rotation shaft 50, and in a state where the rotor 5 is rotating, the crushed piece M2 charged from the charging port 31 is refined when sequentially passing between the liner 4 and the edge 511A, which is the end portion on the outer peripheral side of the first blade 511, and between the liner 4 and the edge 521A, which is the end portion on the outer peripheral side of the second blade 521, and discharged from the discharge port 32. In addition, D1>D2 is satisfied, where a separation distance between the edge 511A and the liner 4 is D1, and a separation distance between the edge 521A and the liner 4 is D2.

As a result, a relatively wide gap between the liner 4 and the edge 511A, which is the end portion on the outer peripheral side of the first blade 511 can be secured. Therefore, the crushed piece M2, which is a raw material, easily enters between the liner 4 and the outer periphery of the first blade 511, and can smoothly transfer therebetween. As a result, the refining treatment, that is, the defibration treatment can be smoothly performed.

In the present embodiment, a configuration for performing refining using a strip-shaped crushed piece M2 as a raw material was described, but the present disclosure is not limited to this, and the shape of the raw material may be, for example, a scale-like, cotton-like, pellet-like, granular, or powdery shape. Moreover, although the case where the raw material contains fibers, that is, paper was described, the present disclosure is not limited to this, and the raw material may not contain fibers. The type of the raw material in the present disclosure is not particularly limited, and may be, for example, food such as grains, seeds, chemicals, fodder, fertilizer, industrial raw materials, industrial products, and the like. Accordingly, the raw material is finely refined, and when the raw material contains fibers, the present disclosure is applied as a defibrating unit that performs defibration into fine fibers, and when the raw material is a non-fibrous raw material, the present disclosure is applied as a crushing unit that performs fine crushing.

Second Embodiment

Figure 5:
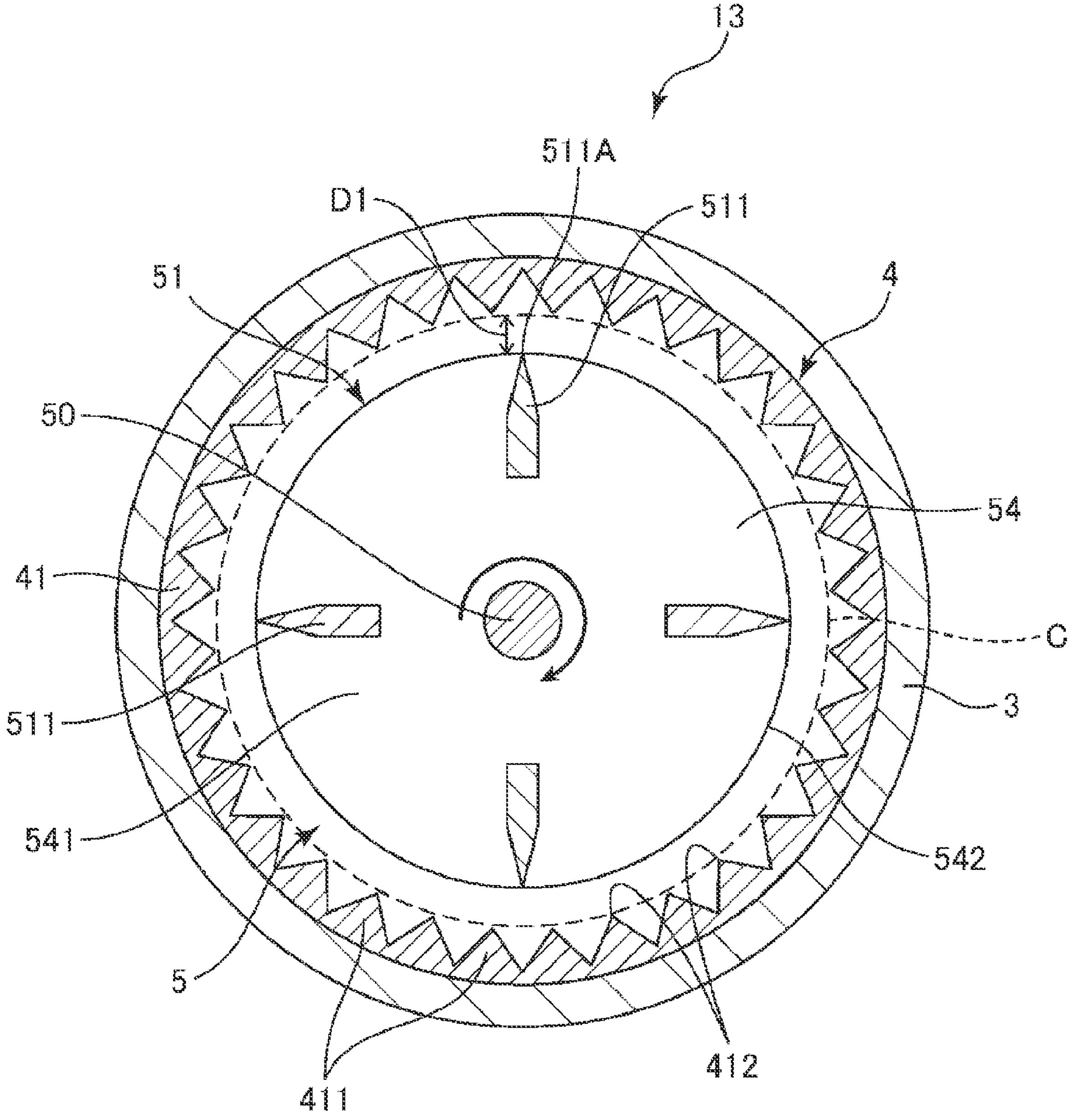
FIG. 5 is a lateral sectional view of a first rotor portion of a refining device according to a second embodiment.

FIG. 5 is a lateral sectional view of the first rotor portion of a refining device according to a second embodiment.

Hereinafter, a second embodiment of the refining device of the present disclosure will be described with reference to FIG. 5, but differences from the first embodiment will be described below, and the description of common points will be omitted.

As illustrated in FIG. 5, in the refining device 13 in the present embodiment, the number of installed first blades 511 in the first rotor portion 51 is smaller than the number of second blades 521 illustrated in FIG. 4. That is, when the number of installed first blades 511 is N1 and the number of installed second blades 521 is N2, N1<N2 is satisfied. In the illustrated configuration, N1 is 4 and N2 is 8. In addition, each of the first blades 511 is disposed around the rotation shaft 50 at equal angular intervals.

As described above, by setting N1<N2, the following advantages occur as compared with the case where N1=N2. That is, when the rotor 5 is rotating at a predetermined rotation speed, the frequency with which the first blade 511 collides with the crushed piece M2 can be reduced. Therefore, the crushed piece M2, which is a raw material, can transfer more smoothly from the space S3 through the space between the liner 4 and the outer periphery of the first rotor portion 51, and the refining treatment, that is, the defibration treatment can be performed more smoothly. In addition, the defibrating efficiency of defibration between the liner 4 and the outer periphery of the second rotor portion 52 is improved by the number of second blades 521, which is N2 larger than N1.

In addition, all or a part of the first blade 511 overlaps the second blade 521 when viewed from the shaft direction of the rotation shaft 50, that is, when viewed from the left side in FIG. 5. With such a configuration, a cleaning member such as a brush can be easily inserted, and maintenance can be easily performed. Further, there is an advantage that the positioning of the first blade 511 and the second blade 521 when assembling the rotor 5 is easy.

In this manner, in the refining device 13, when the number of installed first blades 511 is N1 and the number of installed second blades 521 is N2, N1<N2 is satisfied. Accordingly, the crushed piece M2, which is a raw material, can transfer more smoothly between the liner 4 and the outer periphery of the first rotor portion 51, and the refining treatment, that is, the defibration treatment can be performed more smoothly.

Further, in the refining device 13, it is preferable to satisfy 0.25≤N1/N2≤0.8, and more preferable to satisfy 0.4≤N1/N2≤0.65. Thereby, the refining treatment, that is, the defibration treatment can be performed more smoothly.

When N1/N2 is extremely small, the difference between N1 and N2 becomes large, and the number of installed first blades 511 with respect to the second blade 521 may be extremely small. Therefore, there is a case where the value of D1/D2 is relatively small, or a case where the efficiency of the refining treatment decreases in the first rotor portion 51 depending on other conditions such as the rotation speed of the rotor 5, the size of the raw material, and the supply amount, and the balance of refining may be poor in the first rotor portion 51 and the second rotor portion 52. On the other hand, when N1/N2 is extremely large, the difference between N1 and N2 becomes small, and the improvement in the effect in the case of N1=N2 is small.

Third Embodiment

Figure 6:
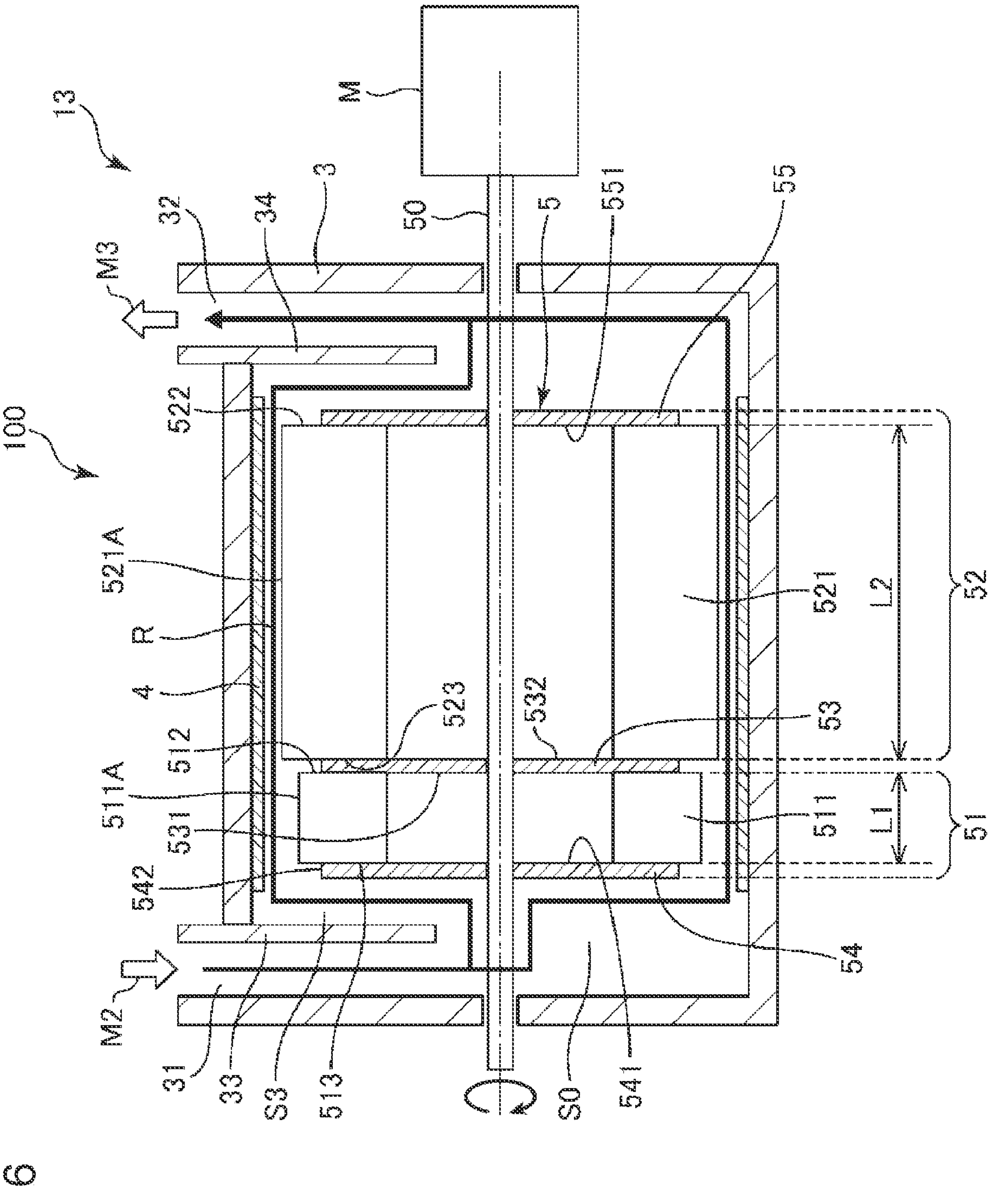
FIG. 6 is a longitudinal sectional view of a refining device according to a third embodiment.

FIG. 6 is a longitudinal sectional view of a refining device according to a third embodiment.

Hereinafter, a third embodiment of the refining device of the present disclosure will be described with reference to FIG. 6, but differences from the first embodiment and the second embodiment will be described below, and the description of common points will be omitted.

As illustrated in FIG. 6, in the refining device 13 according to the present embodiment, the length in the shaft direction of the rotation shaft 50 of the second blade 521 is longer than the length in the shaft direction of the rotation shaft 50 of the first blade 511. That is, when the length in the shaft direction of the rotation shaft 50 of the first blade 511 is L1 and the length in the shaft direction of the rotation shaft 50 of the second blade 521 is L2, L1<L2 is satisfied.

As described above, in the refining device 13, since D1>D2 is satisfied, when N1=N2, the defibrating ability in the first rotor portion 51 is lower than the defibrating ability in the second rotor portion 52. However, by satisfying L1<L2, it is possible to lengthen the time for passing through the second rotor portion 52 having high defibrating ability. Therefore, the second rotor portion 52 can compensate for the low defibrating ability of the first rotor portion 51. As a result, the defibration treatment can be more sufficiently performed while obtaining the effect of the present disclosure.

As described above, when the length in the shaft direction of the rotation shaft 50 of the first blade 511 is L1 and the length in the shaft direction of the rotation shaft 50 of the second blade 521 is L2, L1<L2 is satisfied. Thereby, the defibration treatment, that is, the refining treatment can be more sufficiently performed while obtaining the effect of the present disclosure.

Further, in the third embodiment, it is preferable to satisfy 0.1≤L1/L2<1, and more preferable to satisfy 0.25≤L1/L2≤0.95. As a result, while maintaining the defibrating ability of the first rotor portion 51, the above-mentioned effect of having L1<L2 can be exhibited more remarkably, and the defibration treatment, that is, the refining treatment can be performed more satisfactorily. In other words, with the first rotor portion 51 and the second rotor portion 52, well-balanced refining and efficient refining can be performed.

Fourth Embodiment

Figure 7:
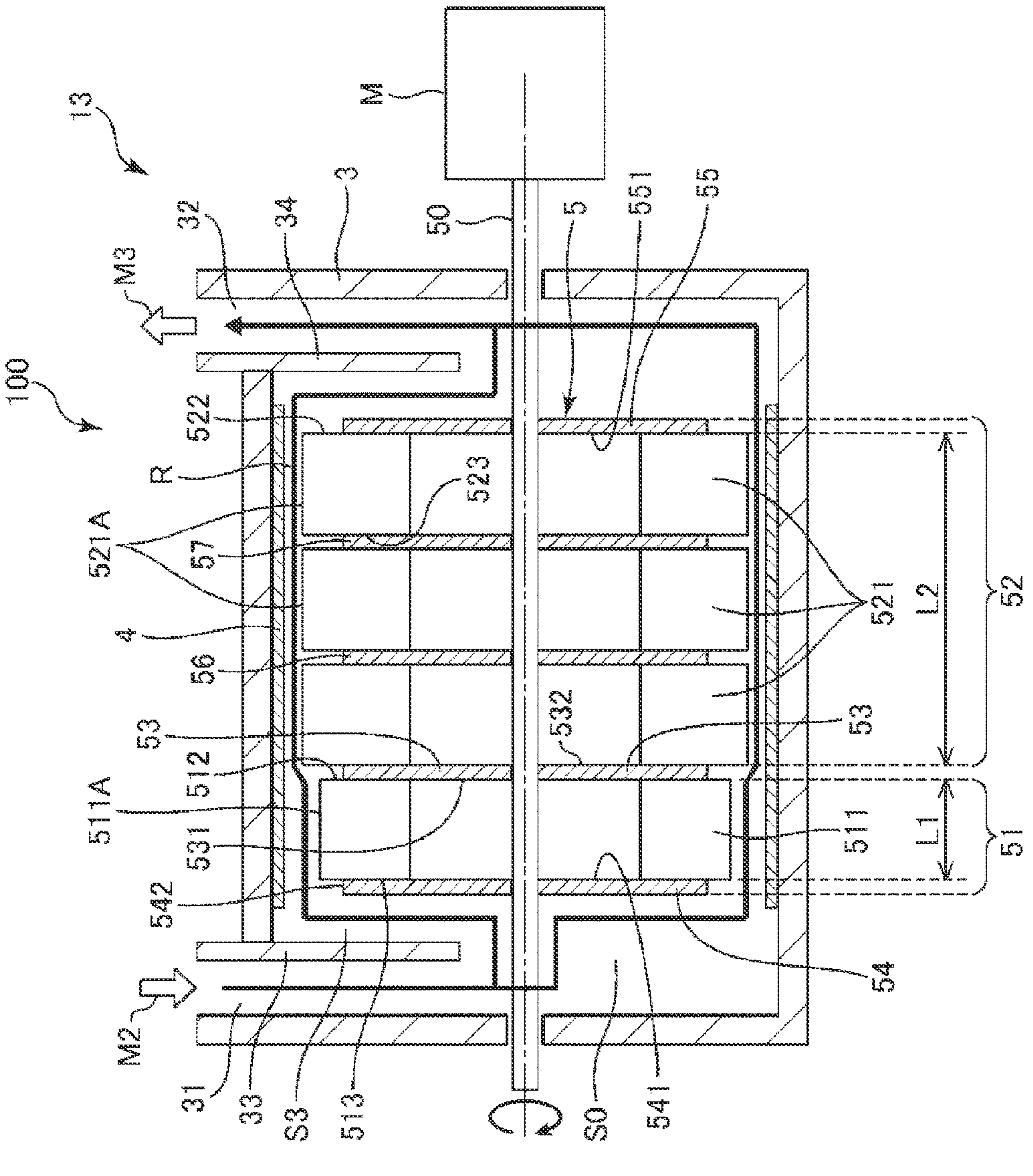
FIG. 7 is a longitudinal sectional view of a refining device according to a fourth embodiment.

FIG. 7 is a longitudinal sectional view of a refining device according to a fourth embodiment.

Hereinafter, a fourth embodiment of the refining device of the present disclosure will be described with reference to FIG. 7, but differences from the third embodiment will be described below, and the description of common points will be omitted.

As illustrated in FIG. 7, in the refining device 13 according to the present embodiment, in the second rotor portion 52, the second blade 521 is divided into a plurality of parts, three in the illustrated configuration, along the shaft direction of the rotation shaft 50. In addition, each of the divided second blades 521 has the same length in the shaft direction of the rotation shaft 50. The length of each of the divided second blades 521 is the same as the length L1 in the shaft direction of the rotation shaft 50 of the first blade 511.

A fixing plate 56 and a fixing plate 57 similar to the fixing plate 53 are provided between the second blades 521 divided into three, respectively. The fixing plate 56 and the fixing plate 57 are disks for fixing the second blade 521 divided into three to the rotation shaft 50. Each of the fixing plate 56 and the fixing plate 57 is provided with a through-hole (not illustrated) through which the rotation shaft 50 is inserted and fixed at the central portion. The fixing plate 53, the side plate 54, and the side plate 55, the fixing plate 56, and the fixing plate 57 are fixed to the rotation shaft 50 by fitting the rotation shaft 50 into through-holes formed therein.

According to the fourth embodiment, the same effect as that of the third embodiment can be obtained, and the following advantages are obtained. In the fourth embodiment, the second rotor portion 52 is divided into three regions, and the second blade 521 is disposed in each region. By differentiating the positions of the edges 521A of the second blade 521 in these three regions, the defibrating ability of the second rotor portion 52 can be partially adjusted according to the shape and material of the crushed piece M2, the conditions of the defibrated material M3 to be generated, and the like.

In the fourth embodiment, when the sum of the lengths in the shaft directions of the rotation shafts 50 of each of the divided second blades 521 is L2 and the length in the shaft direction of the rotation shaft 50 of the first blades 511 is L1, L1 and L2 can be related to each other as described in the third embodiment. That is, L1<L2 can be satisfied, preferably 0.1≤L1/L2<1, and more preferably 0.25≤L1/L2≤0.95. As a result, the same effect as described in the third embodiment can be obtained.

Although the refining device of the present disclosure was described above with respect to each of the illustrated embodiments, the present disclosure is not limited thereto, and any section constituting the refining device can be replaced with any one having a configuration that can exhibit the same function. In addition, any component may be added to the refining device. Further, the refining device of the present disclosure may be a combination of the features of each embodiment.

Further, in the sheet manufacturing apparatus, the raw material supply section 11 and the crushing section 12 may be omitted. In this case, the sheet manufacturing apparatus includes a crushed piece supply section that supplies the crushed piece, instead of the raw material supply section 11 and the crushing section 12.

What is claimed is:

1. A refining device comprising:

a casing having a charging port and a discharge port of a raw material;

a rotor disposed inside the casing and having a rotation shaft, a first rotor portion positioned on the charging port side, and a second rotor portion positioned on the discharge port side; and a liner disposed on an inner surface of the casing along an outer periphery of the rotor, wherein the first rotor portion has a plurality of first blades radially installed around the rotation shaft, the second rotor portion has a plurality of second blades radially installed around the rotation shaft, in a state where the rotor is rotating, the raw material charged from the charging port is refined when sequentially passing between the liner and an end portion on an outer peripheral side of each of the plurality of first blades and between the liner and an end portion on an outer peripheral side of each of the plurality of second blades, and the raw material is discharged from the discharge port, and $D1>D2$, where a separation distance between the liner and the end portion on the outer peripheral side of each of the plurality of first blades is $D1$, and a separation distance between the liner and the end portion on the outer peripheral side of each of the plurality of second blades is $D2$.

2. The refining device according to claim 1, wherein $0.5 \leq D2/D1 \leq 0.95$.

3. The refining device according to claim 1, wherein the end portion on the outer peripheral side of each of the plurality of first blades is positioned closer to the rotation shaft side than the end portion on the outer peripheral side of each of the plurality of second blades.

4. The refining device according to claim 1, wherein $N1<N2$, where a number of the plurality of first blades is $N1$ and a number of the plurality of second blades is $N2$.

5. The refining device according to claim 4, wherein $0.25 \leq N1/N2 \leq 0.8$.

6. The refining device according to claim 1, wherein $L1<L2$, where a length in a shaft direction of the rotation shaft of each of the plurality of first blades is $L1$ and a length in the shaft direction of the rotation shaft of each of the plurality of second blades is $L2$.

* * * * *